April 22, 1958 B. N. WATTS 2,831,981

PHOTO-ELECTRIC RELAY APPARATUS

Filed April 25, 1955

INVENTOR
BERNARD NELSON WATTS
By [signature]
HIS ATTORNEY

United States Patent Office 2,831,981
Patented Apr. 22, 1958

2,831,981

PHOTO-ELECTRIC RELAY APPARATUS

Bernard Nelson Watts, Blaby, England, assignor to The British Thomson-Houston Company Limited, a British company Application April 25, 1955, Serial No. 503,641

Claims priority, application Great Britain May 7, 1954

4 Claims. (Cl. 250—211)

Figures 1, 2, 3:
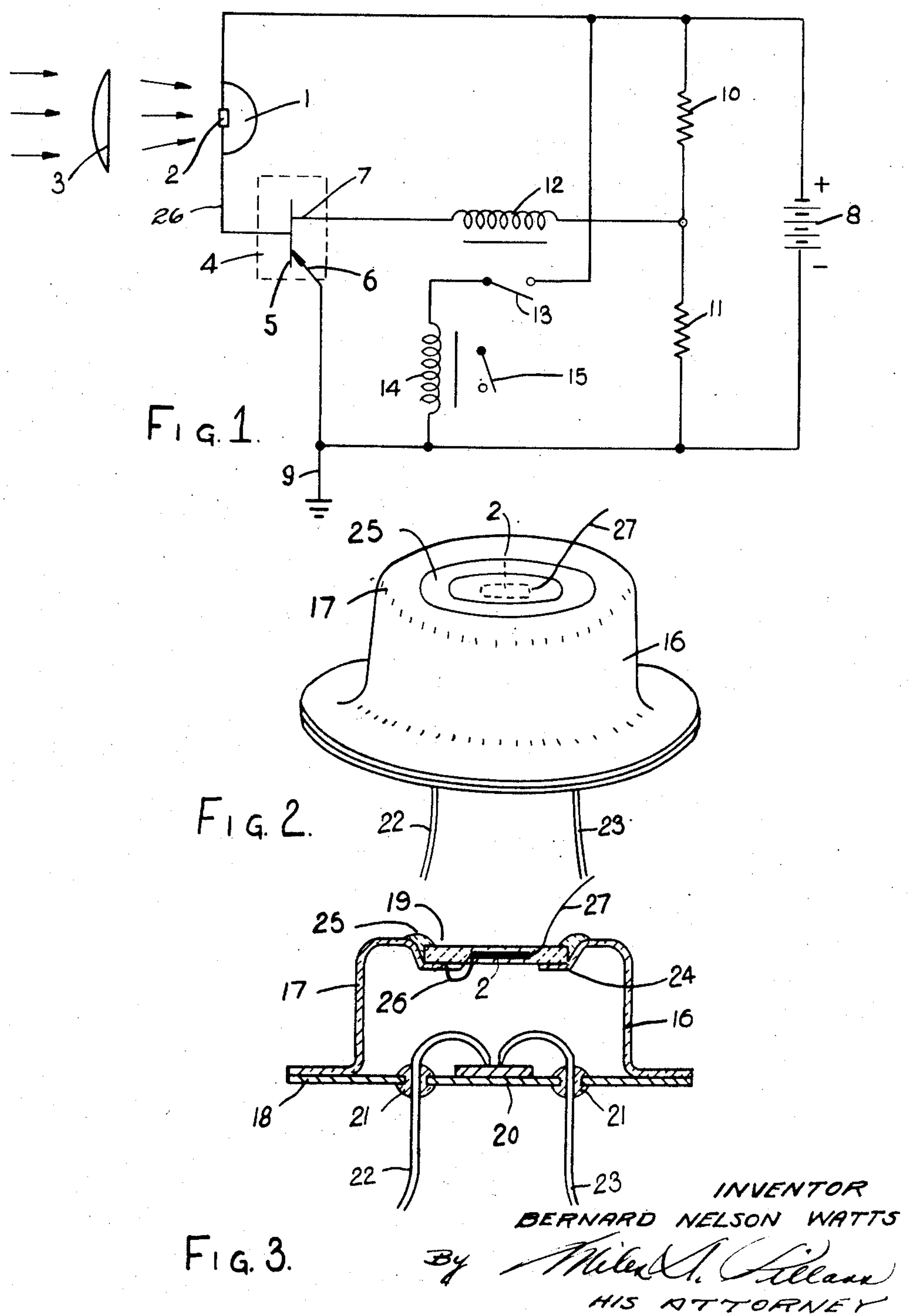

This invention relates to photo-electric relay apparatus comprising a photo-electric cell and an amplifier for amplifying the electric current variations through the cell caused by variations in the light incident upon the cell.

The object of the invention is to provide a means for increasing the sensitivity of such apparatus.

A further object of the invention is to provide a combined light sensitive cell and transistor amplifying device in a single unit.

It is well-known that certain semi-conducting elements, such as germanium and silicon, in addition to their adaptability for providing amplification when used with suitable electrode arrangements now generally termed transistor amplifiers are also sensitive to radiation in the visible spectrum.

The present invention consists in the combination of a photo-electric cell with a photo-sensitive transistor amplifier for amplifying the output from the photo-electric cell, the transistor amplifier being additionally energised by the light variations to which the photo-electric cell is responding whereby to increase amplification of the transistor amplifier.

Thus, the invention enables the employment of both the normal amplification characteristics of the transistor amplifier as well as its sensitivity to light, thereby increasing the over-all sensitivity of the photo-electric cell and amplifier to the incident light variations.

It is preferred to employ for the photo-electric cell a photo-sensitive element of cadmium sulphide, although cadmium selenide, cadmium telluride, mercury sulphide, or mercury selenide may also be used. When subjected to light variations, the resistance of the cadmium sulphide element varies in a manner which is substantially proportional to the light incident upon the cell, but the incident light is only partially absorbed by the cadmium sulphide crystal, the remainder of the incident light being transmitted and thus being lost so far as its photo-electric effect is concerned.

Accordingly the transmitted light is directed on to the transistor amplifier which is employed to amplify the output voltage variations of the cadmium sulphide cell, so that the light transmitted through the cadmium sulphide is usefully employed in increasing the amplification effect of the transistor amplifier.

Since it is desired to utilise the photo-electric effect of the transistor element, the element, preferably germanium, with its associated electrodes is enclosed in an hermetically sealed envelope provided with a window through which the light transmitted through the cadmium sulphide crystal can impinge on the photo-sensitive element of the transistor. The window may conveniently be constituted by a glass transparent to radiation of at least 2 microns in wave lengths, that being the long wave cut-off of the germanium element. Alternatively the window may be constituted of an acrylic resin of transparent nature.

In proximity to the window will then be located the cadmium sulphide crystal with its associated contacts, so that light transmitted through the crystal will pass through the window and be incident upon the sensitive element of the transistor.

Whilst such an arrangement forms the most efficient means for utilising the incident light the variations of which are to be amplified, an arrangement is visualised in which the light directed upon the photo-electric cell is simultaneously directed upon the sensitive element of the transistor amplifier without necessarily passing through the photo-electric cell.

A circuit arrangement utilising the combination of photo cell and transistor amplifier in accordance with the invention, is illustrated in Fig. 1 of the accompanying drawing, Figs. 2 and 3 showing a combined photo-cell and amplifier device forming a feature of the invention in perspective and cross-section respectively.

In Fig. 1 of the drawing, a photo-electric cell is indicated at 1 and preferably consists, as above-mentioned, of a cadmium sulphide crystal 2, upon which incident light is directed through a lens 3. The transistor amplifier used in combination with the photo cell is indicated at 4. This may consist in the usual way of a base member 5 supporting the semi-conductor associated with which is an emitter electrode 6 and a collector electrode 7. The source of operating voltage shown as a battery 8 has its positive terminal connected to one terminal of the photo cell 1 the other terminal of which is connected to the base 5 of the transistor; the negative terminal of the source 8 is connected to the emitter electrode 6 and is indicated as being connected to earth at 9.

Across the source are connected source resistors 10, 11, of which 10 may be approximately twice the value of 11 and of the order of 2,000 ohms. The common terminal of the resistors 10, 11 is connected through the operating winding 12 of a sensitive electro-magnetic relay to the collector 7. The contact 13 of the relay is connected to a circuit including the operating winding 14 of a heavy current relay between the positive and negative terminals of the source 8 so that when the contacts 13 of the sensitive relay close, the winding 14 is energised from the source 8 to close its contacts 15.

Referring now to Figs. 2 and 3 of the drawing, there is shown a photo-sensitive device which can be used in connection with the circuit arrangement of Fig. 1, combining the cadmium sulphide light-sensitive cell with the transistor amplifier device in a single sealed envelope. The envelope is indicated at 16. This consists of a metal casing of generally cylindrical character formed from an upper flanged metal member 17 and a base member 18 secured to the upper member by welding. The flanged metal member 17 is provided with an opening therein closed by a window 19 in which the cadmium sulphide crystal constituting the light sensitive cell is incorporated, the window being of glass or other light transparent material. The casing carries on its base 18 a wafer 20 of semi-conducting material, such as germanium, which is soldered to the base with a low melting point solder. The casing thus constitutes the base electrode of the transistor of which the wafer 20 is an essential part.

Led through insulating metal-to-glass seals 21 are a pair of conductors 22, 23. These conductors extend into the casing 16 and are bent over to engage at their pointed ends the upper surface of the wafer 20 at closely spaced regions thereon. The wafer 20 with the conductors 22, 23, thus constitutes the transistor amplifier, the casing 16 constituting the connection, shown at 26 in Fig. 1, between one terminal of the light-sensitive cell 2 and the base electrode of the transistor.

The light-sensitive cell formed by the cadmium sulphide crystal 2 is embedded in the window 19, the glass of which has a composition such that it will not deleteriously affect the light-sensitive characteristics of the crystal 2 and will, at the same time, be capable of being sealed into the aperture in the casing. As shown in Fig. 3, the aperture in the casing is formed with a flange 24 in which the window embedding the crystal 2 is located, the window being sealed into the casing by means of a mass of soft or solder glass 25 arranged around the rim of the window and in contact with the glass of the window and the metal of the casing. If the casing is formed from a nickel-cobalt-iron alloy, such as "Fernico," a soft boro-phosphate glass, such as is disclosed in U. S. patent specification No. 2,615,817 can be satisfactorily sealed to the "Fernico" casing and to the glass in which the cadmium sulphide crystal is embedded.

The cadmium sulphide crystal is provided with conductors connected to spaced points thereon, both conductors being emergent from the glass in which the crystal is embedded. One of the conductors 26 is in contact with the casing 16, while the other 27 is led out from the glass of the window to form a further lead corresponding with the conductor which connects the photo-sensitive cell to the positive terminal of the source 8 in the Fig. 1 arrangement.

While the transistor amplifier has been shown in the drawing as being of the point contact type, it is evident that this may be substituted by a P–N junction type of transistor if desired. Whereas in the arrangement illustrated in the drawing the incident light or the light transmitted through the photo cell will be incident upon the semi-conductor element in the proximity of the emitter and collector electrodes of the transistor if the junction type of transistor is employed the light will be arranged to be incident upon the junction between the P and N types of material in the transistor.

An advantage accruing to the present arrangement resides in the extension of the photo-electric response. The long-wave limit of sensitivity for germanium, as pointed out above, is 2 microns while that of cadmium sulphide is only 0.8 of a micron; for a continuous radiation spectrum the energy may be used in the wavelength band from 0.8 micron to 2 microns which otherwise would not be photo-electrically effective.

What I claim as new and desire to secure by Letters Patent of the United States is:

1. Photo-electric apparatus comprising, in combination, a photo-electric cell, a photo-sensitive transistor amplifier coupled to said photo-electric cell for amplifying the current variations through said cell produced by variations in light incident thereupon, said amplifier being energised additionally by said light variations in a sense to increase the amplification of said amplifier.

2. Photo-electric relay apparatus comprising, in combination, a photo-electric cell, a first source of voltage connected to produce current through said cell, a positive terminal of said first source being connected to one terminal of said cell, a transistor amplifier for amplifying the output from the photo-electric cell, said transistor amplifier being additionally energized by the light variations to which the photo-electric cell is responsive, said transistor amplifier comprising base, emitter, and collector electrodes, means connecting said base electrode to the other terminal of said cell, a relay winding, means connecting said collector electrode to the negative terminal of said first source through said relay winding a second source of voltage having its positive terminal connected to the negative terminal of said first source, means connecting said emitter electrode to the negative terminal of said second source, and an external circuit connected to one terminal of said first source of voltage and to the terminal of opposite sense of said second source of voltage and adapted to be completed when an armature associated with said relay winding is moved in response to a change in energisation of said winding.

3. A light-sensitive electric device comprising a photosensitive electric cell consisting of a light-transmissive wafer of light-sensitive material, electrodes located in contact with spaced regions of said wafer, a casing of electrically conducting material, means sealing said wafer into a window in said casing whereby one of said electrodes is in conatct with said casing and the other of said electrodes is insulated therefrom, an electrical lead connected to said other of said electrodes, a wafer of light-sensitive semi-conducting material, means mounting said wafer in contact with said casing in the path of light entering said casing through said window, electrical conductors making contact with closely spaced regions of said wafer of semi-conducting material, and means for insulatingly leading said conductors through the wall of said casing.

4. A light-sensitive electric device comprising a metal casing, an aperture in the wall of said casing, a window sealed in said aperture, said window consisting of a light transparent material having embedded therein a crystal wafer of light-sensitive material selected from the group consisting of cadmium sulphide, cadmium selenide, cadmium telluride, mercury sulphide, mercury selenide, conductors connected to spaced points on said crystal wafer and emergent from said light transparent material, one of said conductors being electrically connected to said casing a piece of semi-conducting material having light-sensitive properties secured in contact with an internal wall of said casing and located so as to be in the path of light entering the casing through said window, a pair of conductors making contact with closely spaced regions of an exposed face of said piece of semi-conducting material, said pair of conductors constituting emitter and collector electrodes of a transistor of which said casing forms the base electrode, and said conductor being led through glass-to-metal seals in the wall of said casing so as to be insulated from said casing and from one another.

References Cited in the file of this patent

UNITED STATES PATENTS

| | | |
|---|---|---|
| 2,425,250 | Lamb | Aug. 5, 1947 |
| 2,514,405 | Marihart | July 11, 1950 |
| 2,592,683 | Gray | Apr. 15, 1952 |
| 2,644,852 | Dunlap | July 7, 1953 |
| 2,675,509 | Barton | Apr. 13, 1954 |
| 2,686,279 | Barton | Aug. 10, 1954 |
| 2,718,613 | Harris | Sept. 20, 1955 |
| 2,742,550 | Jenness | Apr. 17, 1956 |

OTHER REFERENCES

"28 Uses for Junction Transistors," January 1955, by Sylvania Electric Products, Inc., 1740 Broadway, New York 19, N. Y., pp. 29–32.

"Radio and Television News," June 1954, pp. 52–53, note Figure 3.